June 3, 1924.
C. F. CHRISTOPHER
WHEEL RIM
Filed Nov. 20, 1920
1,496,623
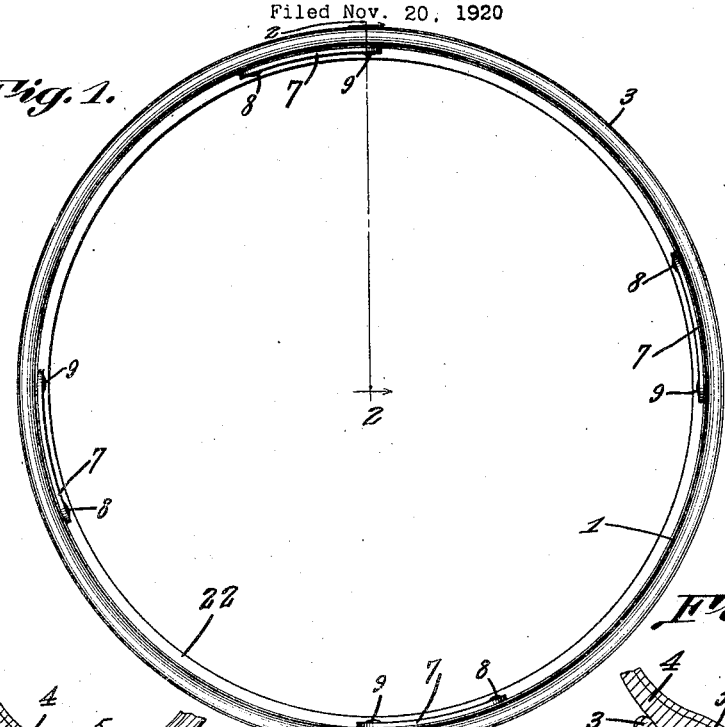
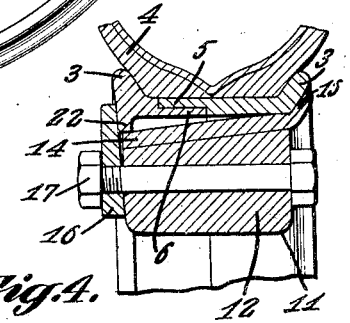
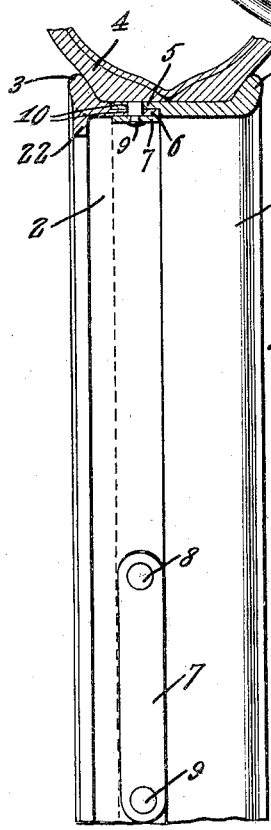
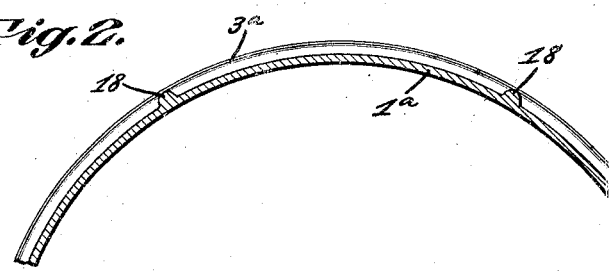
C.F. Christopher, Inventor
By C.A. Snow & Co.
Attorneys Patented June 3, 1924.

1,496,623

UNITED STATES PATENT OFFICE.

CALVIN F. CHRISTOPHER, OF ASHEVILLE, NORTH CAROLINA.

WHEEL RIM.

Application filed November 20, 1920. Serial No. 425,556.

*To all whom it may concern:*

Be it known that I, CALVIN F. CHRISTOPHER, a citizen of the United States, residing at Asheville, in the county of Buncombe and State of North Carolina, have invented a new and useful Wheel Rim, of which the following is a specification.

This invention aims to provide a demountable rim wherein the disadvantages incident to a transversely divided rim having relatively movable ends may be avoided, the construction being such that the tire may be removed without difficulty from the rim, the peripheral surface of the rim being smooth, so as to avoid injury to the tire.

The invention aims, further, to provide novel means for connecting the members of the rim releasably, and to provide novel means for mounting the rim on a wheel body.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the drawings:—

Figure 1 shows in side elevation, a demountable rim constructed in accordance with the invention; Figure 2 is a section on the line 2—2 of Figure 1, a portion of the tire appearing as an added detail; Figure 3 is a fragmental transverse section, showing the rim in place on the wheel body; and Figure 4 is a circumferential section showing a modified form of the invention, parts being broken away.

The device forming the subject matter of this application includes a demountable rim comprising an annular main member 1 and an annular auxiliary member 2, the auxiliary member being narrower than the main member. The members 1 and 2 of the rim are supplied with elements 3 of any desired sort for retaining a tire 4. The member 1 has a reduced flange 5, the member 2 having a reduced flange 6, the flange 6 of the member 2 being received within the flange 5 of the member 1. The auxiliary member 2 is supplied at its outer edge with an annular lip 22 which projects toward the axis of the rim.

Resilient latches 7 are pivoted at 8 to the flange 6 of the auxiliary member 2 for lateral swinging movement, the latches having studs 9 adapted to be received in openings 10 formed in the flange 6 of the member 2 and in the flange 5 of the member 1.

The numeral 11 marks a wheel body comprising a felly 12 and a felly band 14 having a side wing 15. The felly band 14 slants transversely of the wheel body, away from the side wing 15. Clips 16 engage one side of the wheel body and are held on the felly 12 by securing devices 17, which may be bolts and nuts.

When the demountable rim is mounted on the wheel body, the main member 1 abuts against the side wing 15 of the felly band 14, the annular lip 22 of the auxiliary member 2 bearing on the periphery of the felly band at that edge of the felly band which is remote from the wing 15. The securing devices 17 are tightened up, the clips 16 are pressed against the lip 22, and the demountable rim is crowded over against the side wing 15.

When the securing devices 17 are loosened, the clips 16 may be swung inwardly toward the axis of the wheel body and then the demountable rim may be slid laterally off the wheel body. The latches 7 are sprung to disengage the studs 9 from the openings 10, the latches being swung slightly on their pivotal mountings 8, so that the studs do not register with the openings. Then, the auxiliary member 2 may be slid laterally out of engagement with the main member 1 and out of engagement with the tire 4, this lateral sliding movement taking place the more readily, because the auxiliary member 2 is narrower than the main member 1. It is to be observed that the peripheral surface of the rim is absolutely smooth at the place where the flange 5 of the main member 1 cooperates with the auxiliary member 2. Consequently, the bead of the tire 4 which is located at the left hand side of the device in Figure 2, will not be cut, worn or frayed.

When the demountable rim is mounted on the wheel body, as shown in Figure 3, the latches 7 are not relied upon, to any great extent, for holding the members 1 and 2 together, this observation being true, because the demountable rim is held between the wing 15 and the clips 16, each of the members 1 and 2 of the rim having an abrupt shoulder adapted to cooperate with the flange of the other member of the rim to prevent the members of the rim from becoming too far overlapped, with a consequent outward springing of the flange 5, in a direction radially of the rim. The primary function of the latches 7 is to hold the members 1 and 2 together, when the rim is carried as a spare.

The device may be adapted to receive a solid tire, without making extensive changes in the structure described. Thus, in Figure 4 of the drawings, parts hereinbefore alluded to have been designated by numerals previously used, with the suffix "a". The annular main member 1a is supplied with transverse ribs 18, spaced from each other circumferentially of the rim, and adapted to be received in the transverse grooves which are found, often, in a solid tire. Figure 4 will render it evident that the device forming the subject matter of this application may be used advantageously with a tire of any sort.

I claim:—

In a device of the class described, a demountable rim comprising main and auxiliary annular members, the auxiliary member being narrower than the main member, said members being provided with reduced circumferential flanges on their inner edges, the flange of the auxiliary member being disposed in the flange of the main member, the peripheral surface of the auxiliary member being flush with the peripheral surface of the flange of the auxiliary member, each member having an abrupt shoulder against which the flange of the other member abuts, means for holding the main and auxiliary members together, said means comprising a latch mounted on the flange of the auxiliary member and engaged detachably with the flange of the main member, the auxiliary member being provided at its outer edge with a lip which projects toward the axis of the rim, the main member being plain at its outer edge, thereby enabling the outer edge of the main member and the lip of the auxiliary member to support the rim on a transversely inclined surface.

In testimony that I claim the foregoing as my own, I have hereto affixed my signature in the presence of two witnesses.

CALVIN F. CHRISTOPHER.

Witnesses:
J. M. SHOOK,
WM. H HARRISON.